Oct. 25, 1932.   S. M. CHASE   1,885,079
COUPLER
Filed Jan. 15, 1930   4 Sheets-Sheet 1

INVENTOR
SHERWOOD M. CHASE.
BY
ATTORNEYS

Oct. 25, 1932.    S. M. CHASE    1,885,079
COUPLER
Filed Jan. 15, 1930    4 Sheets-Sheet 2

INVENTOR
SHERWOOD M. CHASE.
BY
ATTORNEYS

Oct. 25, 1932.   S. M. CHASE   1,885,079
COUPLER
Filed Jan. 15, 1930   4 Sheets-Sheet 3

INVENTOR
SHERWOOD M. CHASE
BY
ATTORNEYS

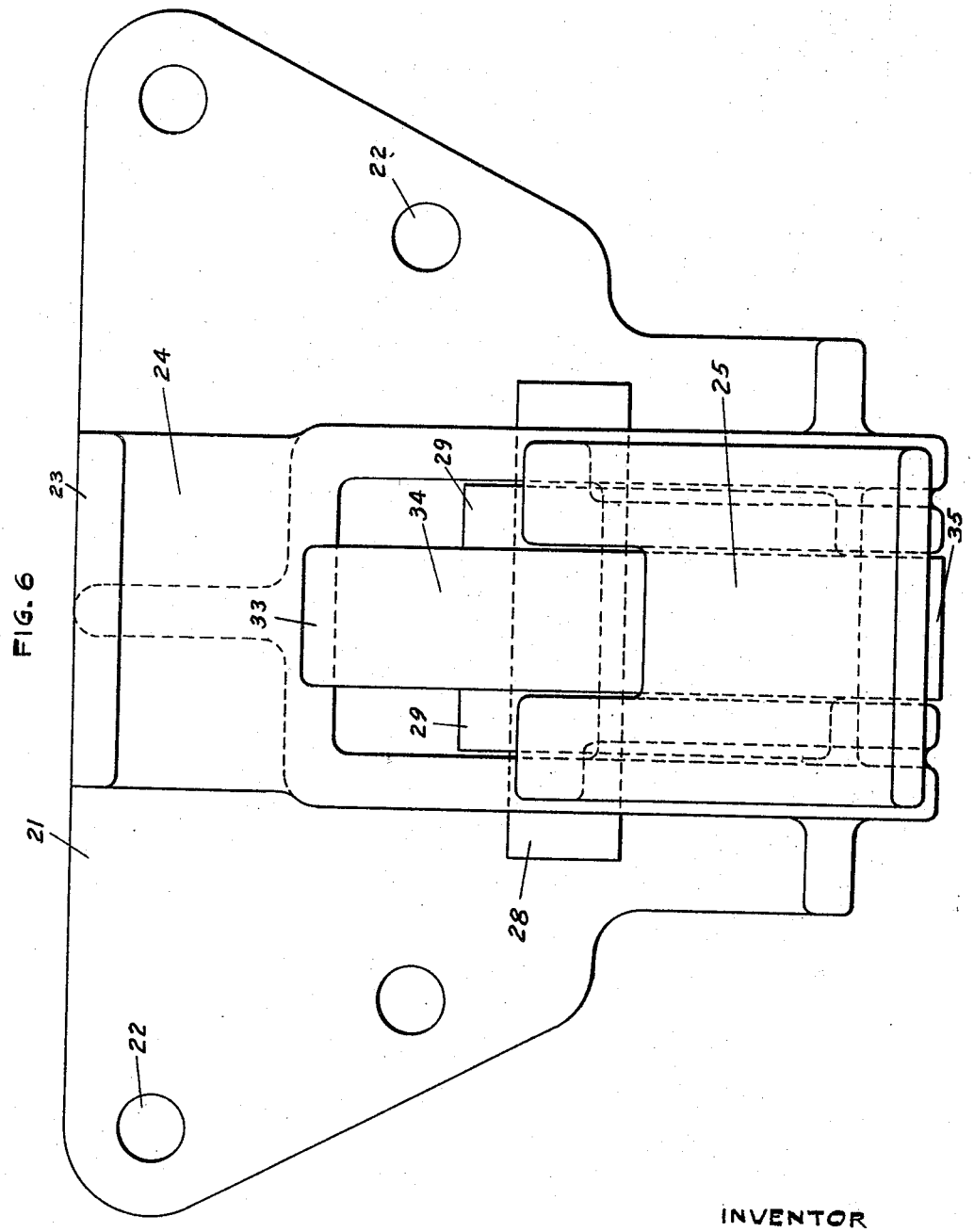

Patented Oct. 25, 1932

1,885,079

UNITED STATES PATENT OFFICE

SHERWOOD M. CHASE, OF COLUMBUS, OHIO, ASSIGNOR TO THE CHASE FOUNDRY & MANUFACTURING COMPANY, OF COLUMBUS, OHIO, A CORPORATION OF OHIO

COUPLER

Application filed January 15, 1930. Serial No. 420,885.

My invention relates to couplers.

It is the object of my invention to provide an adjustment both upwardly and downwardly to take care of the irregularities of the surface over which the vehicle passes and which has a proper construction to meet the conditions of the swinging of the trucks from side to side in order to guide them.

It is my object to provide a guide connected with the bail of the coupler at or near the outer end of the guide and oscillating around the same central hinge with a counter weight to hold the bail and guide in their proper relative positions.

It is a further object to provide a bail and guide yieldingly engaging one another to prevent unnecessary oscillation of the bail and guide.

It is a further object to provide a bail and guide that are both hinged and have the same general movement.

Referring to the drawings,

Figure 6 is a front elevation of the construction of Figure 4.

Figure 1:
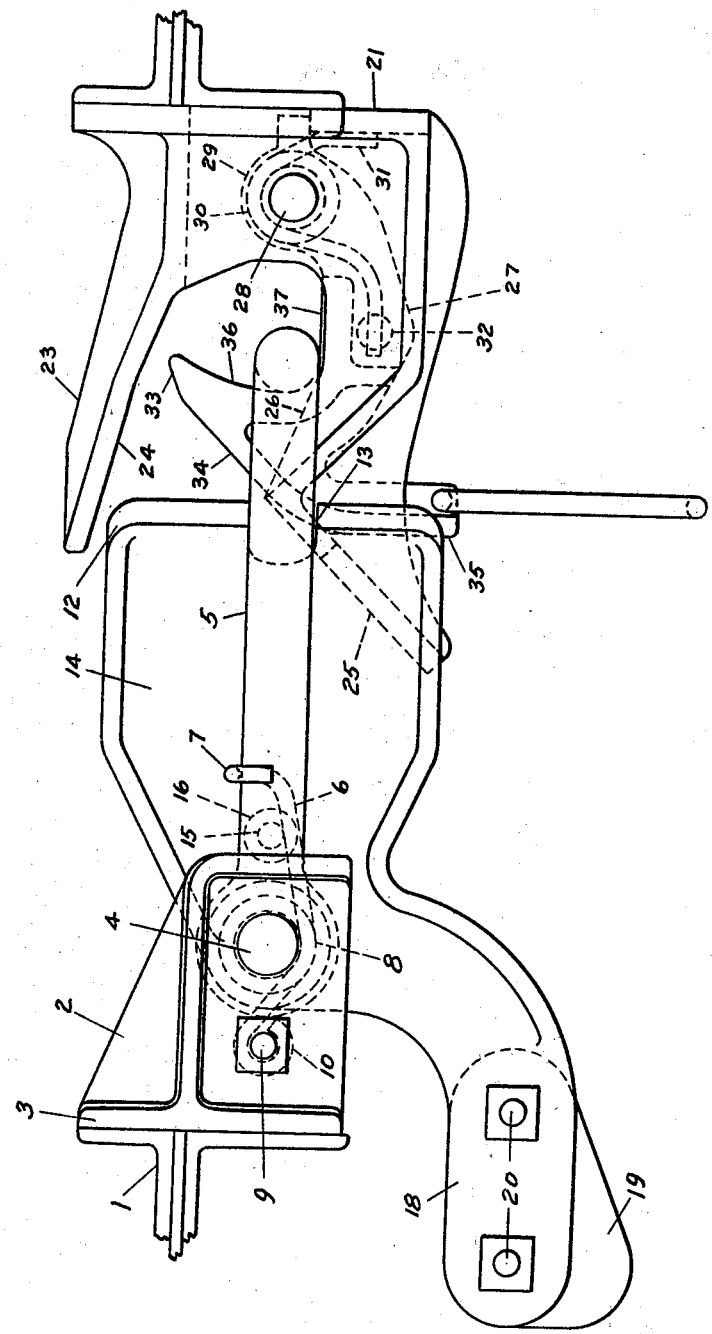
Figure 1 is a side elevation showing the bail and coupler head connected together in operation.
Figure 2:
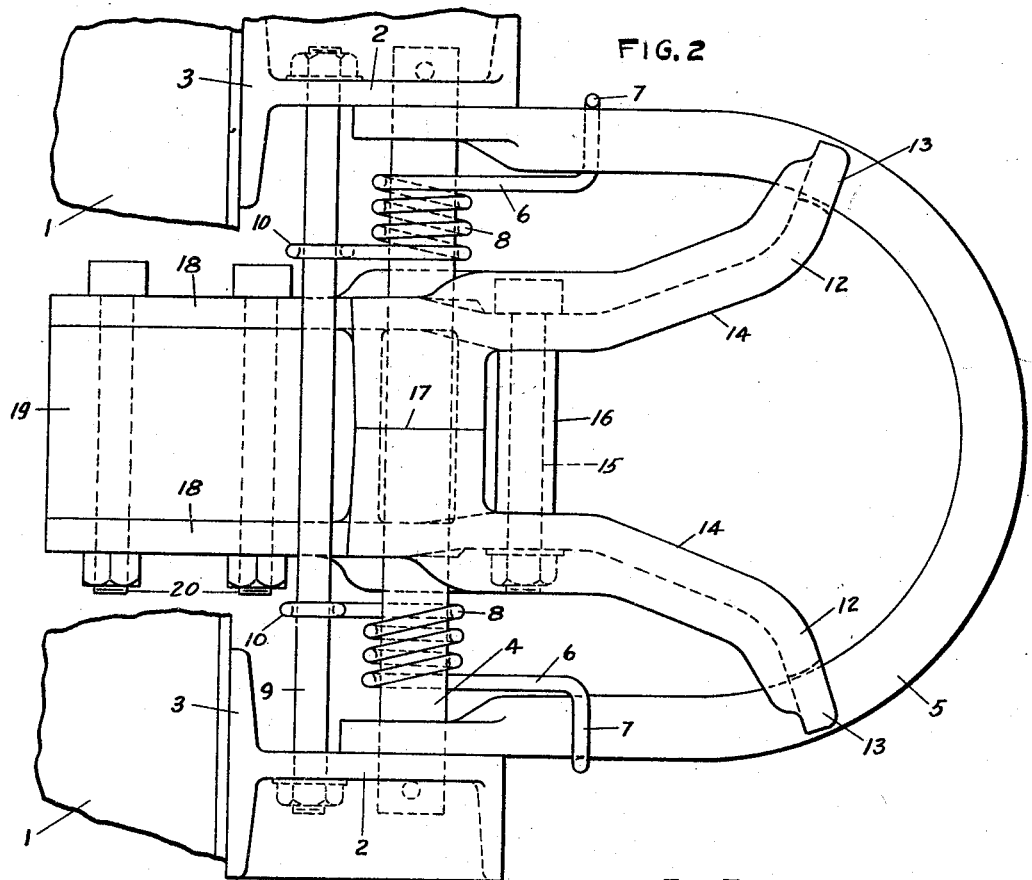
Figure 2 is a top plan view of the bail.
Figure 3:
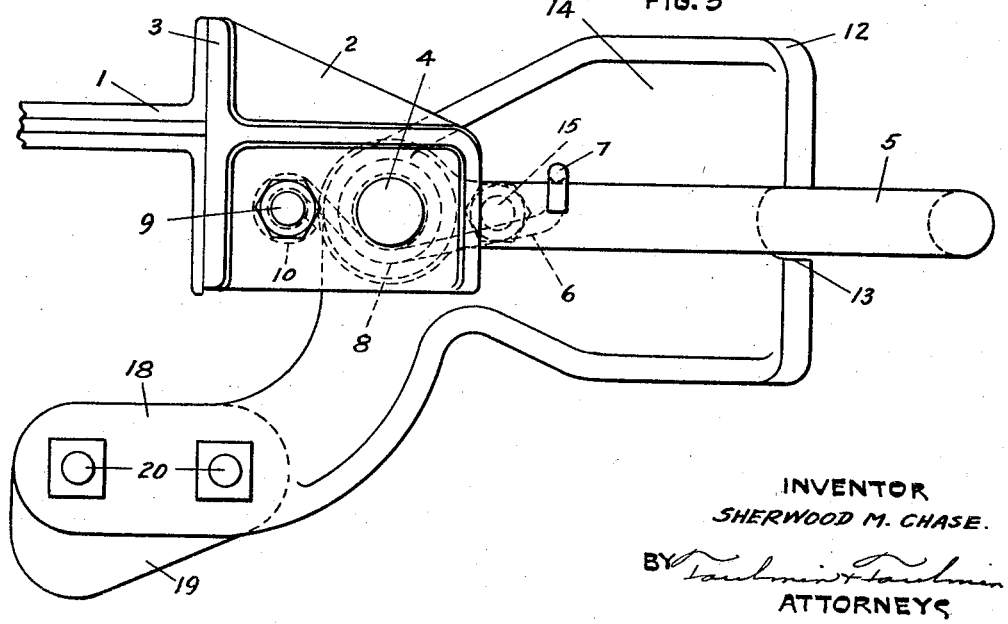
Figure 3 is a side elevation thereof.

Referring to the drawings in detail, 1 indicates the end members of a truck vehicle upon which there are mounted the outwardly extending brackets 2 having a base plate 3 mounted upon the frame plates 1. These brackets 2 carry a main shaft 4 known as the bail shaft. This shaft carries the U-shaped bail 5 that is yieldingly pressed downwardly and yieldingly resisted in an upward direction by the springs 6 which are connected at their forward ends at 7 by a hook on the top of the bail 5, are wound as at 8 around the bail shaft 4 and have a permanent attachment to the rod 9 carried between the brackets 2. This attachment is in the form of a loop 10.

This tendency of the springs 6 to depress the bail is counteracted by the weighted guide arms 12 which are provided with outer jaws 13 for engaging the bail.

These guide arms extend above and below the bail and form broad guiding surfaces 14, the purpose of which will be hereinafter described. These guide arms are pivotally mounted upon the bail shaft 4 and are connected together by the bolt 15 which carries the spacer sleeve 16 between the guide arms 12. Each guide arm is separate from the other being joined by the bolt 15 and engaging one another along the line of their respective faces at 17. The rear ends of the guide arms are designated 18 and carry between them a weight 19 on the bolts 20 which extend through the rearwardly extending arms 18.

This weight 19 serves to counteract the effect on the spring 6 and to normally maintain the bail 5 in the horizontal position. The presence of the weight and spring permits the upward and downward movement of the bail and guide arms as a unit to accommodate the locking of the bail into the coupler head, to accommodate the irregularities of the ground over which the respective trucks are traveling, and to accommodate the lateral movement of the trucks one with respect to the other. The coupler head having received the bail 5 is inserted between the arms 12, and as the truck carrying the coupler head or the truck carrying the guide arms and bail moves relative to the other truck, the guiding faces 14 engage the outer lateral surfaces of the coupler head thereby maintaining the vehicle in relative alignment.

Figure 4:
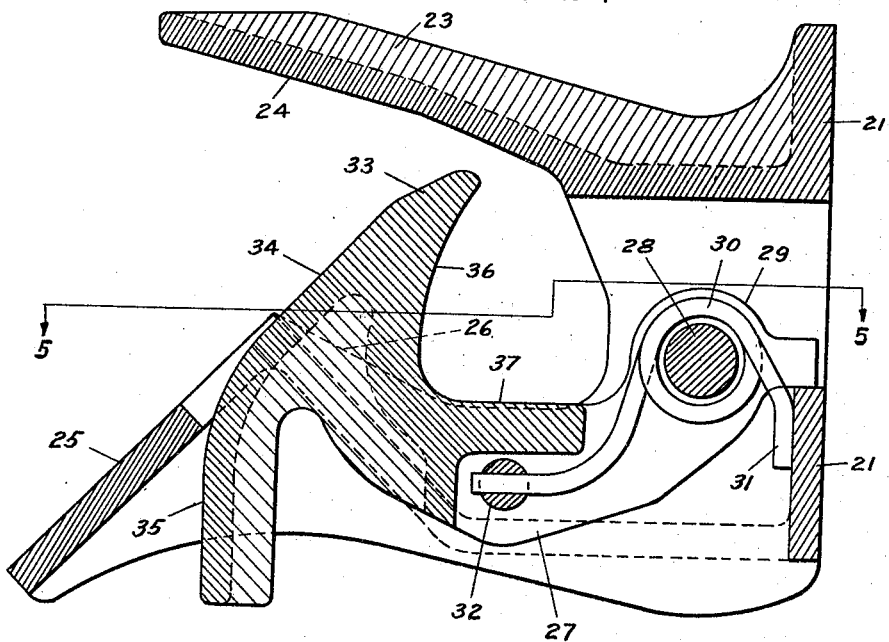
Figure 4 is a section taken vertically through the coupler head.
Figure 5:
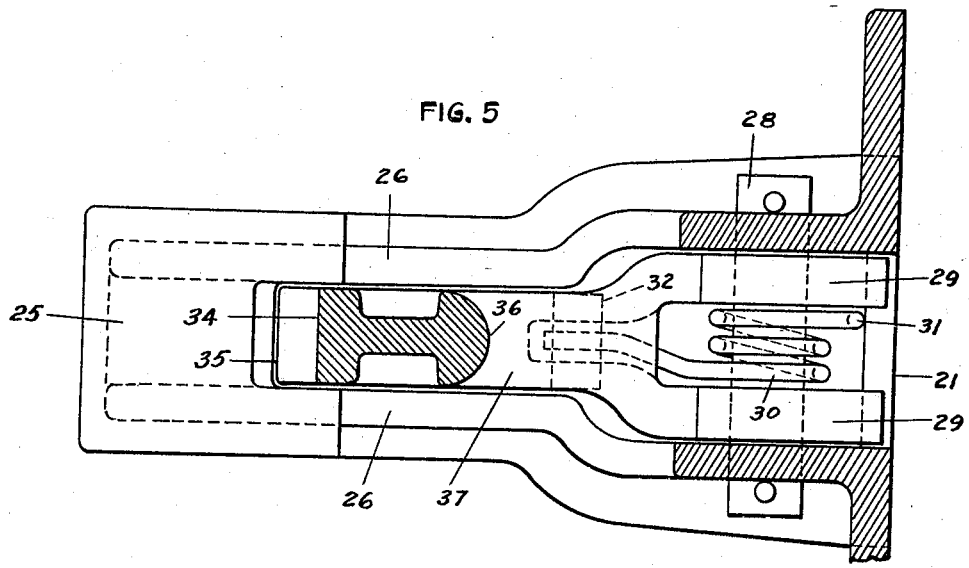
Figure 5 is a section on the line 5—5 of Figure 4.

Referring to the coupler head shown in Figures 4, 5 and 6, it consists of a back plate 21 engaging the end of the truck and retained thereon by bolts in the bolt eyes 22. This plate carries an upper jaw 23 having a downwardly and inwardly tapered surface 24 for guiding the bail downwardly into locking position.

It is also provided with a stationary lower jaw having an outer, upwardly and inwardly inclined surface 25 and an inwardly and downwardly disposed surface 26. This lower jaw is slotted to receive a spring pressed pivotally mounted locking hook generally designated 27. This hook is mounted on the transverse shaft 28, which shaft is carried in the spaced side walls of the lower jaw. The mounting of the locking hook 27 is through the agency of a pair of spaced arms 29 between which is mounted a coil spring 30 wound on the shaft 28, one end of which at 31 rests against the wall 21 of the coupler head and the other end of which is inserted through the transverse pin 32 carried within the locking hook 27.

This hook comprises a hook portion 33 having a forward slanting surface 34 in line with the surface 25 of the lower coupler jaw. This surface turns downwardly behind the coupler jaw surface 25 as at 35. The rear face of the hook is formed into a vertical arcuate surface 36 and a substantialy horizontal surface 37 that substantially coincides with the surface 26 of the lower jaw. When the bail is inserted, the sloping face 34 of the hook in cooperation with the sloping face 25 of the lower jaw and the downwardly and inwardly sloping surface 24 of the upper jaw tends to guide the bail into a position behind the hook which is depressed by the entering bail.

It will be understood that I desire to comprehend within my invention such modifications as may be necessary to adapt it to varying conditions and uses.

Having thus fully described my invention, what I claim as new and desire to secure by Letters Patent, is:—

1. In combination, a pivoted bail, guide arms mounted independent of the bail but moving therewith, a coupler head adapted to receive said bail and to enter between said guide arms.

2. In combination, a pivoted bail, guide arms mounted independent of the bail but moving therewith, a coupler head adapted to receive said bail and to enter between said guide arms, a hook in said coupler head to lock the bail therein for free lateral movement whereby the guide arms on the bail may freely engage the side walls of the coupler head.

3. In combination, a pivoted bail, guide arms mounted independent of the bail but moving therewith, a coupler head adapted to receive said bail and to enter between said guide arms, a hook in said coupler head to lock the bail therein for free lateral movement whereby the guide arms on the bail may freely engage the side walls of the coupler head, and means associated with said bail and coupler head to normally maintain them in coupling position.

4. In combination, a pivoted bail, guide arms mounted independent of the bail but moving therewith, a coupler head adapted to receive said bail and to enter between said guide arms, a hook in said coupler head to lock the bail therein for free lateral movement whereby the guide arms on the bail may freely engage the side walls of the coupler head, and means associated with said bail and coupler head to normally maintain them in coupling position, said means comprising yielding means and a weight.

5. In combination, a pivoted bail, guide arms moving therewith, a coupler head adapted to receive said bail and to enter between said guide arms, a hook in said coupler head to lock the bail therein for free lateral movement whereby the guide arms on the bail may freely engage the side walls of the coupler head, and means associated with said bail and coupler head to normally maintain them in coupling position, said means comprising yielding means and a weight, said yielding means tending to move the bail and coupler head into coupling position and the weight tending to resist moving the parts from coupling position.

6. In combination, a slotted coupler head, a yieldingly mounted hook adapted to reciprocate through said slotted head, an arcuate bail, spaced guiding arms mounted independent of the bail engaging said bail at their outer end forming a cooperating structure with said bail for the reception of said coupler head in the space between the arms and the bail.

7. In combination, a coupler head having a slot between the jaws thereof, a reciprocating hook movable through the jaw space, a U-shaped bail and spaced guiding jaws attached thereto but mounted independent thereof for engaging the sides of the coupler head jaws when said bail is inserted in the coupler head jaws behind said hook.

8. In combination, a coupler head having vertically disposed spaced jaws, a guiding head having horizontally spaced guiding jaws, a horizontally disposed bail mounted independent of but operatively connected to said guiding jaws and adapted to be inserted between the vertically disposed coupler head jaws and a vertically reciprocal hook in said jaws for locking said bail therein.

9. In combination, a coupler head having vertically disposed spaced jaws, a guiding head having horizontally spaced guiding jaws, a horizontally disposed bail mounted independent of but operatively connected to said guiding jaws and adapted to be inserted between the vertically disposed coupler head jaws and a vertically reciprocal hook in said jaws for locking said bail therein, yielding means for aligning said bail and guiding jaws as a unit.

10. In combination, a coupler head having vertically disposed spaced jaws, a guiding head having horizontally spaced guiding jaws, a horizontally disposed bail adapted to be inserted between the vertically disposed coupler head jaws and a vertically reciprocal hook in said jaws for locking said bail therein, yielding means for aligning said bail and guiding jaws as a unit, and weight means cooperating for aligning said guide jaws and bail.

11. In a coupler mechanism, a transverse bail shaft, a U-shaped bail mounted thereon, a pair of diverging guiding jaws supported by said bail shaft independent of the bail and diverging laterally within the space formed by the bail.

12. In a coupler mechanism, a transverse bail shaft, a U-shaped bail mounted thereon, a pair of diverging guiding jaws mounted on said bail shaft independent of the bail and diverging laterally within the space formed by the bail, the ends of said jaws engaging the inside of said bail.

13. In combination, a bail shaft, a U-shaped bail mounted thereon, spaced jaws mounted thereon located within the space defined by the bail, yielding means mounted on said shaft and connected to said bail tending to depress said bail and jaws, a weight means connected to said jaws tending to elevate said bail and said jaws.

14. In combination in a truck, spaced brackets, a bail shaft therebetween, a spring shaft therebetween, a U-shaped bail mounted on the bail shaft, a spring mounted thereon connected at one end to the bail and at the other to the spring shaft, spaced jaws pivotally mounted on said bail shaft extending within the space defined by the bail and having the ends thereof engaging the bail, arms extending rearwardly from said bail shaft, a weight between said arms whereby said spring and weight cooperate to maintain the bail and guide arms in operative position.

15. In combination in a coupler head of an upper and lower jaw spaced apart, said lower jaw having a space therebetween for receiving a locking hook, a shaft at the base of said jaw, a bifurcated hook mounted thereon, a spring mounted between the arms of the bifurcated hook on said shaft, one end of which engages said hook and the other end of which engages said coupler head, and means cooperating with the spring to hold the hook in operative position with the hooking end of the hook free.

In testimony whereof I affix my signature.

SHERWOOD M. CHASE.